United States Patent
Haynes et al.

[11] Patent Number: 5,131,271
[45] Date of Patent: Jul. 21, 1992

[54] ULTRASONIC LEVEL DETECTOR

[75] Inventors: Kevin M. Haynes, Northlake; Steven E. Margison, Downers Grove, both of Ill.

[73] Assignee: Magnetrol International, Inc., Downers Grove, Ill.

[21] Appl. No.: 509,136

[22] Filed: Apr. 16, 1990

[51] Int. Cl.[5] ............... G01F 23/28; G01S 15/04; G01S 15/08
[52] U.S. Cl. ................. 73/290 V; 367/98; 367/99; 367/95; 367/908; 181/124
[58] Field of Search ............. 181/123, 124; 73/290 V; 364/571.04, 571.07, 509, 557; 367/87, 95, 98, 99, 908

[56] References Cited

U.S. PATENT DOCUMENTS

| | | | |
|---|---|---|---|
| 2,755,455 | 7/1956 | Gordon, Jr. | 340/3 |
| 3,115,615 | 12/1963 | Saper | 340/3 |
| 3,184,969 | 5/1965 | Bolton | 73/290 |
| 3,985,030 | 10/1976 | Charlton | 73/290 |
| 4,000,650 | 1/1977 | Snyder | 73/290 |
| 4,114,441 | 9/1978 | Magri | 73/290 |
| 4,144,517 | 3/1979 | Baumoel | 340/1 L |
| 4,145,914 | 3/1979 | Newman | 73/290 |
| 4,169,255 | 9/1979 | Hulsman et al. | 367/100 |
| 4,170,765 | 10/1979 | Austin | 73/290 V |
| 4,202,049 | 5/1980 | Wetzel | 367/96 |
| 4,203,324 | 5/1980 | Baumoel | 73/290 V |
| 4,221,004 | 9/1980 | Combs et al. | 367/114 |
| 4,270,177 | 5/1981 | Endoh | 364/571.07 |
| 4,315,325 | 2/1982 | Blades | 367/98 |
| 4,355,536 | 10/1982 | McShane et al. | 73/633 |
| 4,373,390 | 2/1983 | van Dyke et al. | 73/304 C |
| 4,437,497 | 3/1984 | Enander | 141/1 |
| 4,470,299 | 9/1984 | Soltz | 73/290 V |
| 4,487,065 | 12/1984 | Carlin et al. | 73/290 V |
| 4,578,997 | 4/1986 | Soltz | 73/290 V |
| 4,596,144 | 6/1986 | Panton et al. | 73/620 |
| 4,630,245 | 12/1986 | Dam | 367/93 |
| 4,630,482 | 12/1986 | Traina | 73/597 |
| 4,644,513 | 2/1987 | Czajkowski | 367/108 |
| 4,673,927 | 6/1987 | Cianciavicchia et al. | 367/908 |
| 4,675,854 | 6/1987 | Lau | 367/908 |
| 4,700,569 | 10/1987 | Michalski et al. | 73/290 V |
| 4,701,893 | 10/1987 | Muller | 367/87 |
| 4,715,226 | 12/1987 | Dorr | 73/290 V |
| 4,748,846 | 6/1988 | Haynes | 73/290 V |
| 4,780,861 | 10/1988 | Stembridge et al. | 367/150 |
| 4,785,664 | 11/1988 | Reebs | 73/290 V |
| 4,815,323 | 3/1989 | Ellingen | 73/290 V |
| 4,821,569 | 4/1989 | Soltz | 73/290 V |
| 4,831,565 | 5/1989 | Woodward | 364/571.01 |
| 4,853,901 | 8/1989 | Barber | 367/27 |
| 4,868,797 | 9/1989 | Soltz | 73/290 V |
| 4,873,655 | 10/1989 | Kondraske | 364/571.07 |
| 4,901,245 | 2/1990 | Olson et al. | 364/509 |

OTHER PUBLICATIONS

Application Analog Intergrated Circuit, chap. 1.

*Primary Examiner*—William A. Cuchlinski, Jr.
*Assistant Examiner*—Diego F. F. Gutierrez
*Attorney, Agent, or Firm*—Marshall, O'Toole, Gerstein, Murray & Bicknell

[57] ABSTRACT

An ultrasonic level detector includes a transducer for generating and receiving bursts of sonic energy at a surface to locate the position of the surface. In response to receiving a burst of energy reflected from the surface, the transducer generates an electrical signal, which is then supplied to a variable gain amplifier. After amplification, the electrical signal is supplied to a comparator and a peak detector. The comparator generates a timing signal upon the electrical signal exceeding a threshold. A window generator circuit generates a receive window that controls whether the electrical signal is supplied to the comparator and the magnitude of the threshold on the comparator. The peak detector determines the maximum amplitude of the electrical signal, which may be used to vary the amplifier gain and the number of pulses included in an excitation signal which drives the transducer. Upon receipt of the timing signal, a microprocessor determines the distance between the transducer and the detected surface.

10 Claims, 10 Drawing Sheets

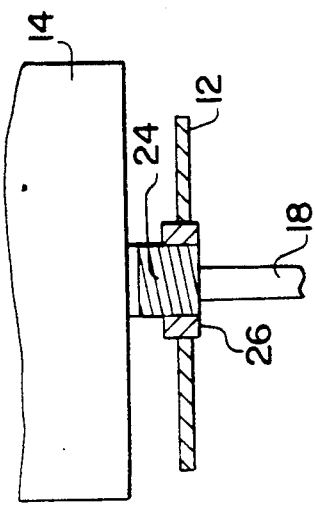
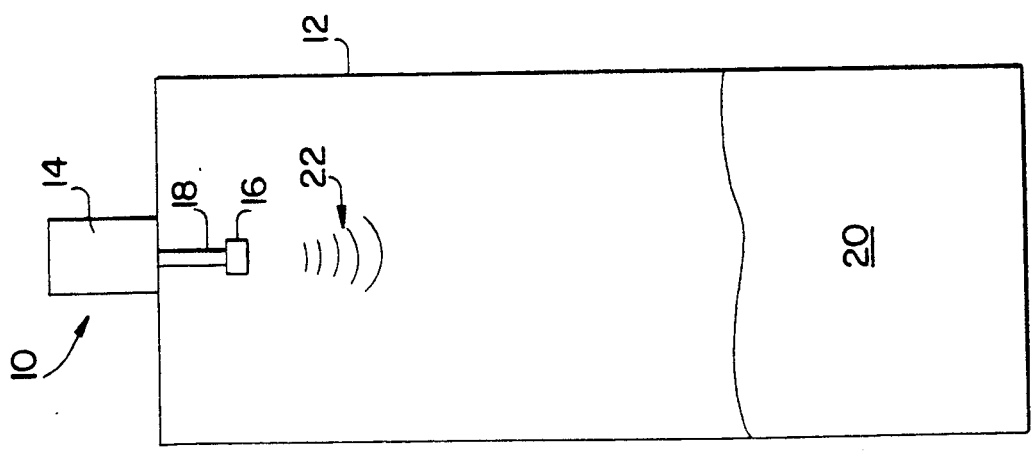

ULTRASONIC LEVEL DETECTOR

BACKGROUND OF THE INVENTION

The present invention relates to ultrasonic level detectors, and more particularly to an ultrasonic level detector having improved signal processing features.

Ultrasonic level detectors are used to determine the level of liquids or dry bulk materials within various types of containers such as storage tanks, pipes, etc. Ultrasonic level detectors of this type generally determine the level of the liquid or material by using a transducer to generate a burst of ultrasonic energy towards the surface to be detected. The energy burst is reflected by the surface and the reflected echo is detected by the transducer. The level of the surface within the tank is determined based upon the amount of time required for the energy burst to travel from the transducer to the surface and back.

While the operation of such a detector is simple in concept, various practical problems arise in the implementation of such devices. One such problem involves the reception by the transducer of multiple echoes of the burst of energy or echoes from the internal structure of the container, such as internal pipes, for example. In this case, the detector might have difficulty distinguishing the echo corresponding to the surface to be located from the other echoes. Also, random electrical noise may be generated in the processing circuitry of the detector by adjacent devices, such as motors for example. These spurious electrical signals may also cause the detector to have difficulty in properly detecting the echo.

One attempt to remedy this problem is described in U.S. Pat. No. 4,901,245 to Olson, et al., which involves the use of a "receive window" of a variable size. In order for the Olson system to recognize an echo signal as one that corresponds to the surface being located, the echo signal must be detected within the receive window. All electrical signals received outside the receive window are thus considered by the Olson system to be spurious signals that do not properly represent the level of the surface.

The Olson system, which determines whether the echo signal occurs within the receive window through the use of a computer program, is primarily a software-based system and does not appear to provide redundancy in checking the validity of echo signals. Moreover, the Olson system does not appear to provide any manner of attenuating electrical signals that are received outside the receive window.

Moreover, the Olson system is not a through-air system, but is instead a relatively complicated, nonintrusive through-liquid system. Such a nonintrusive, through-liquid system must radiate bursts of sonic energy through both the wall of the container and the liquid in the container. The walls of the container may be of various materials, such as steel or plastic for example, and may have various thicknesses. The amount by which the sonic energy is attenuated depends upon both the wall material and thickness. The liquid within the container may also contribute a varying degree of attenuation since different liquids may have different attenuation coefficients.

Consequently, the nonintrusive, through-liquid Olson system includes complicated means for compensating for various wall materials and thicknesses and for different liquids stored in the tank. For example, the Olson system includes a calibration routine in which the transducer is excited with various frequencies to generate echo signals the magnitudes of which are stored and analyzed. The use of such compensation schemes is not required in intrusive, through-air systems since the ultrasonic energy bursts are not required to travel through the container wall and the liquid in the container.

U.S. Pat. No. 4,487,065 to Carlin, et al. discloses an intrusive, through-air ultrasonic level detection system that utilizes receive windows. However, the Carlin system requires a series a periodically spaced reflective disks in the direct path between the transducer and the liquid surface being detected. Consequently, the Carlin system has a relatively complex windowing scheme which requires the utilization of a separate receive window for each of the reference disks. The use of such a complicated detection scheme is believed to be unduly complicated and costly to implement.

Another problem in the operation of level detectors is that the strength of the reflected echoes, and the corresponding magnitude of the electrical signals generated therefrom, may vary considerably. This may be caused, for example, by the fact the level of the surface being detected may vary, so that the distance travelled by the burst of energy may also vary. Because the energy burst is attenuated by an amount corresponding to the distance it travels, the resultant electrical signals generated by the transducer will have varying magnitudes.

Many different approaches to remedy this problem have been proposed. Most of these approaches involve the use of some type of automatic gain control, wherein the gain of an amplifier in a level detector is varied depending upon the amplitude of the electrical signal received by the detector. While some of these approaches may be satisfactory, they offer limited operational advantages and flexibility of operation.

For example, U.S. Pat. No. 3,985,030 to Charlton discloses an ultrasonic detector that generates a transducer excitation signal having a variable number of pulses. The Charlton detector also has a variable gain device for determining the gain of a detector in accordance with the distance that bursts of energy must travel. However, the Charlton detector does not change both the gain and the number of excitation signals based upon the magnitude of an echo signal.

SUMMARY OF THE INVENTION

The present invention is directed to an ultrasonic level detector having various improved signal processing features.

In one aspect, the invention is directed to an ultrasonic detector for sensing the location of a surface to be detected with respect to a transducer. The detector includes an excitation circuit for periodically generating an excitation signal that is used to drive the transducer. The transducer radiates an energy burst, receives reflected energy from the surface to be detected, and generates an electrical signal based upon the reflected energy. The electrical signal is supplied to a detection circuit, which may include a comparison circuit having a threshold, and the comparison circuit compares the electrical signal with the threshold to determine whether an echo signal has been received. The detector also includes a window generator circuit that generates a successively narrowed receive window. During the receive window, the threshold of the comparison circuit has a relatively low value, while outside the receive window the comparison circuit has a relatively large threshold. As a result, the comparison circuit effectively ignores all electrical signals generated by the transducer that are received outside the receive window so that spurious signals generated by the transducer are ignored.

In another aspect of the invention, the receive window duration is used to control a switch to selectively shunt the electrical signal generated by the transducer to ground. In particular, outside the receive window, the electrical signal is shunted to ground to prevent a detection circuit from erroneously recognizing spurious signals as valid echo signals. However, during the receive window, the switch is controlled not to shunt the electrical signal to ground, thus allowing the detection circuit to receive the electrical signal and recognize an echo signal.

In a further aspect of the invention, the detector operates to control the magnitude of the electrical signal generated by the transducer. To this end, the detector has a variable gain amplifier and an excitation circuit that generates an excitation signal with a variable parameter, such as the number of excitation pulses that may be transmitted in the excitation signal for example. The number of excitation pulses and the amplifier gain are controlled based upon the magnitude of the electrical signals generated by the transducer as determined by a detection circuit, which may include a peak detector for example. As a result, the magnitude of the electrical signals generated by the transducer remains relatively constant, even though the magnitude of the reflected bursts of energy received by the transducer may vary considerably.

This aspect of the invention may be advantageously implemented with the use of a gain table in memory. The gain table may include numbers specifying the number of pulses that are to be included in an excitation signal generated by the transducer, and the table may also contain logic signals specifying a discrete number of amplifier gains.

In another aspect of the invention, the detector is an intrusive, through-air detector for determining the level of a surface in which bursts of sonic energy from which an echo signal is generated are passed only through air between a transducer and the surface to be determined. The energy bursts are not passed through any liquid in a container nor are they passed through the walls of the container. The detector uses a receive window substantially centered about the surface being detected, and the window may be successively narrowed about the surface. This aspect of the invention results in a relatively simple and accurate detector which does not have to take into account the effects of various liquids on the speed of energy bursts transmitted between the transducer and the surface, nor does it need to account for energy burst speed variations due to the material and thickness of container walls.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is a schematic diagram of a preferred embodiment of a level detector fixed to a container;

FIG. 1a is an elevational view of a portion of the detector as mounted on the top of a container with a portion of the container being shown in cross section;

DETAILED DESCRIPTION OF A PREFERRED EMBODIMENT

Figure 2:
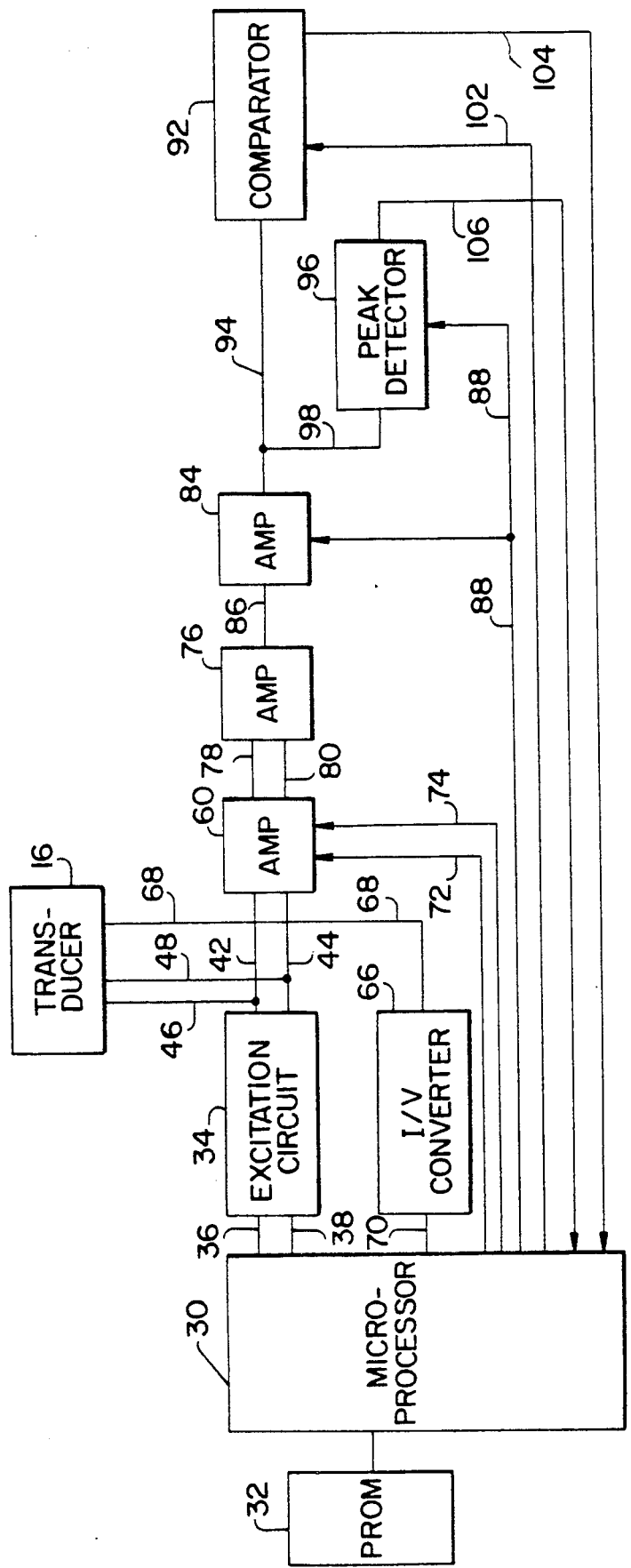
FIG. 2 is a block diagram of the electronics of the level detector of FIG. 1.

A preferred embodiment of an ultrasonic level detector 10 in accordance with the invention is shown in FIG. 1. The level detector 10, which is shown fixed to the top of a container 12, which may be any type of container such as a liquid storage tank or a pipe, comprises a housing 14 connected to a transducer 16 via a shaft 18. The container 12 is shown with a liquid 20 therein.

In operation, the transducer 16 is excited with a burst of electrical energy comprising one or more electrical pulses of an ultrasonic frequency. The transducer 16 converts the electrical excitation signal to a burst of sonic energy 22 and radiates the sonic energy into the interior of the container 12. Upon impacting the surface of the liquid 20, the sonic energy 22 is reflected back, or echoes, towards the transducer 16, which receives the echo and converts it back into an electrical signal.

The electrical echo signal is then transmitted to processing circuitry inside the housing 14, and the detector 10 determines the distance between the transducer 16 and the surface of the liquid 20 based upon the time delay between the transmission of the sonic energy by the transducer 16 and the receipt of the echo signal.

This process of radiating sonic energy and receiving the reflected echo signal to determine the liquid level is repeated at regular time intervals, such as four times per second for example.

While the detector in accordance with the invention is described at points herein as a "level" detector, the detector could be used to measure flow or other parameters. Also, the detector could be used to measure levels other than liquid levels.

The detector 10 is an intrusive, through-air detector in which the pulses of sonic energy from which an echo signal is generated are passed only through air to and from the liquid surface, and not through any intervening medium such as liquid or the walls of the container 12. The pulses are transmitted and received through the transducer housing, but the housing is considered to be part of the transducer 16, and the effect of the transducer housing on the speed of the pulses can be taken into account in the detector design since that effect is known and is not varied by the mounting of the transducer 16. The term "intrusive" means that the transducer 16 is in fluid communication with the interior of the container 12. The direct path of the burst of sonic energy between the transducer 16 and the surface of the liquid is substantially unobstructed.

The mounting of the detector 10 to the top of the container 12 is shown in more detail in FIG. 1a, which is an elevational view of a portion of the detector 10 as mounted on the top of the container 12, with a portion of the container 12 being shown in cross section. The detector 10 has a two-inch diameter NPT threaded member 24 which is threadably connected to a collar 26 connected to the top of the container 12.

A block diagram of the electronics of the detector 10 is shown in FIG. 2. The detector 10 includes a microprocessor 30 that controls the overall operation of the detector 10 in accordance with a computer program stored in a programmable read-only memory (PROM) 32. The microprocessor 30 is coupled to an excitation circuit 34 via a pair of lines 36, 38. The excitation circuit 34 generates an excitation signal having one or more electrical pulses of an ultrasonic frequency, which may be 50 kHz for example, and transmits it to the transducer 16 via a first pair of lines 42, 44 and a second pair of lines 46, 48. After the transducer 16 generates a corresponding burst of sonic energy and receives the reflected echo, the transducer 16 transmits the electrical echo signal to a variable gain amplifier 60 via the second pair of lines 46, 48 and the first pair of lines 42, 44.

Since the speed of the sonic energy through air depends upon the temperature of the air, the transducer 16 contains a temperature sensor 62 (shown in FIG. 3) which draws a current whose magnitude is related to the sensed air temperature. The temperature sensor 62 may be a thermistor, for example. As described in more detail below, the temperature sensor 62 is connected to a current-to-voltage (I/V) converter 66 via a line 68. The converter 66 generates a voltage corresponding to the sensed temperature to allow the microprocessor 30 to determine the actual distance between the transducer 16 and the liquid level by taking the temperature into account. This voltage signal is transmitted to the microprocessor 30 via a line 70.

The transducer 16 may be a conventional transducer, such as a piezoelectric crystal in a suitable transducer housing for example, capable of transmitting sonic energy or vibrations in response to being electrically excited and generating an electrical signal in response to receiving reflected energy.

The gain of the amplifier 60 is controlled by a pair of logic signals, each of which is supplied to the amplifier 60 via one of a pair of lines 72, 74. The amplifier 60 generates dual outputs which are provided to a second amplifier 76 via a pair of lines 78, 80. The second amplifier 76 generates a single-ended output and provides that output to a third amplifier 84 via a line 86. The gain of the third amplifier 84 may be controlled by a logic signal supplied via a line 88 from the microprocessor 30.

The output of the amplifier 84, which is an analog voltage signal having a magnitude corresponding to the reflected sonic energy received by the transducer 16, is supplied to a comparator 92 via a line 94 and to a peak detector 96 via a line 98. The comparator 92 and the peak detector 96 are part of a detection circuit for detecting the echo signal. As described in more detail below, the comparator 92 generates an output signal when the magnitude of the echo signal input via the line 94 exceeds a predetermined threshold.

The comparator 92 responds to echo signals only during a certain time interval following the transmission by the transducer 16 of the vibrations. This time interval is referred to herein as a "receive window." As described below, since the comparator 92 is only responsive during the receive window, all electrical signals which occur on the line 94 outside the receive window are ignored. The receive window time interval is determined by a logic signal transmitted from the microprocessor 30 to the comparator 92 via a line 102. The output signal generated by the comparator 92 is transmitted to the microprocessor 30 via a line 104.

The peak detector 96 determines the largest magnitude of the echo signal. This peak magnitude is a voltage signal and is transmitted to the microprocessor via a line 106. As described below, the peak magnitude is used by the microprocessor 30 in certain cases to adjust the gain of the amplifier 60 and/or to vary the number of electrical excitation pulses transmitted by the excitation circuit 34 to the transducer 16.

Figure 3:
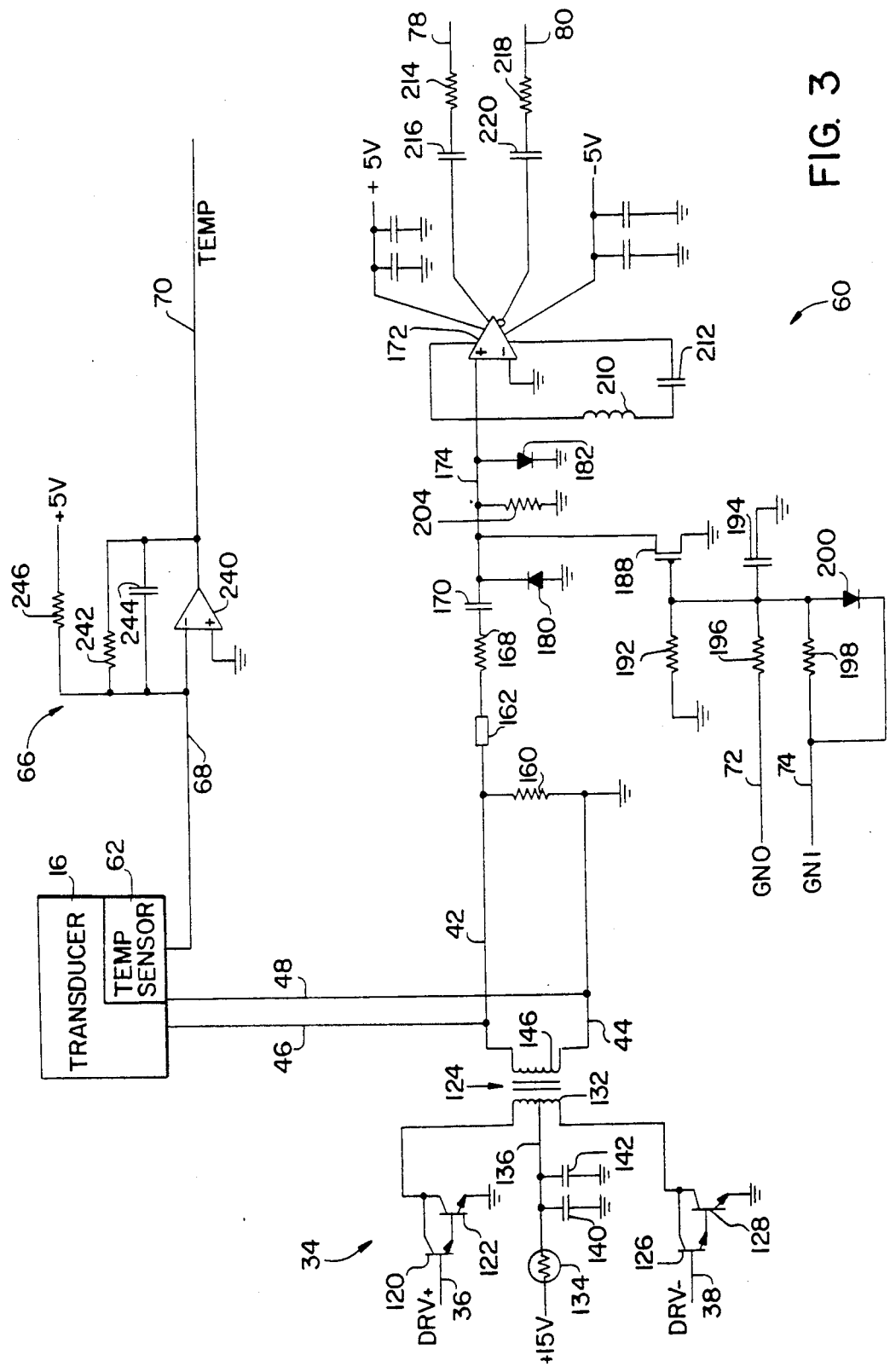
FIG. 3 is a circuit diagram of the excitation circuit 34, the current-to-voltage converter 66, and the amplifier 60 shown as blocks in FIG. 2.

Now referring to FIG. 3, a circuit diagram of the excitation circuit 34, the current-to-voltage converter 66, and the amplifier 60 is shown. The excitation circuit 34 includes a first transistor 120 and a second transistor 122 connected in Darlington fashion. The transistors 120, 122 are switched in accordance with a positive drive signal, DRV+. The transistors 120, 122 are connected to a transformer 124. A second pair of transistors 126, 128 connected in Darlington fashion and connected to the transformer 124 are switched by a negative drive signal, DRV−.

A primary winding 132 of the transformer 124 is connected to a positive temperature coefficient thermistor 134 via a line 136. The thermistor 134 acts as a fuse to prevent component damage if an error in the generation of the DRV+ and DRV− signals occurs. Power is supplied to the primary winding 132 from a power source, which may provide +15 volts for example. A pair of capacitors 140, 142 are coupled to the line 136.

In the operation of the excitation circuit 34, the DRV+ and DRV− signals are switched from one to ten times at a frequency of about 50 kHz, and a corresponding number of high voltage pulses are formed across a secondary winding 146 of the transformer 124. The high voltage pulses, which may be 300 volts peak to peak, are transmitted to the transducer 16 via the lines 46, 48.

Figure 5:
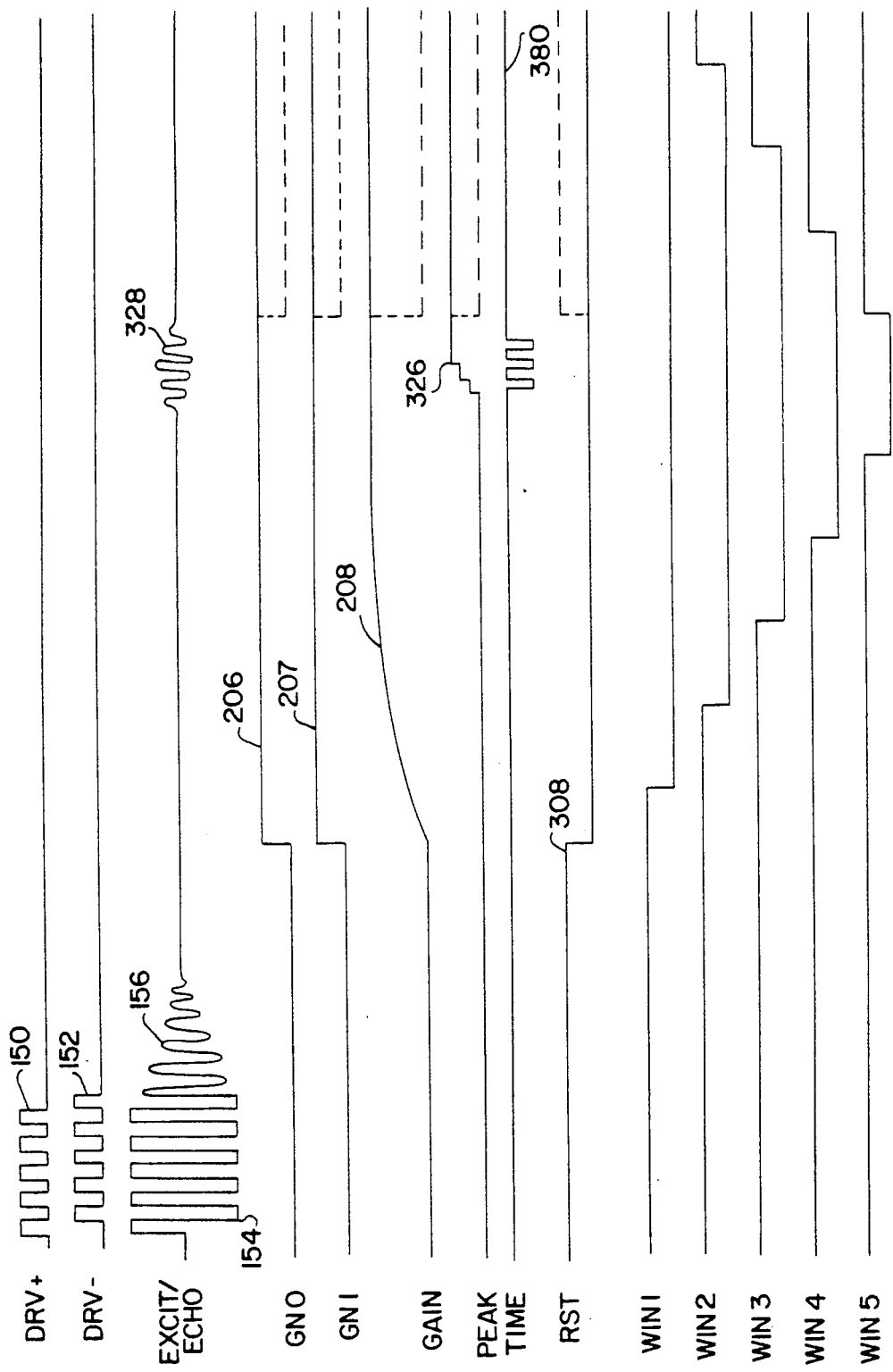
FIG. 5 illustrates a number of electrical waveforms occurring in the level detector during its operation.

Referring to FIG. 5, the general shape of an exemplary pair of drive signals DRV+ and DRV− 150, 152 on the lines 36, 38, respectively, are shown. Each of the DRV+ and DRV− signals is a 50% duty cycle square waveform varying in magnitude from zero to five volts. An exemplary excitation signal 154 that would be generated across the lines 46, 48 due to the DRV+ and DRV− signals 150, 152 is also shown in FIG. 5. The signal 154 is a 50% duty cycle waveform having five pulses with a maximum amplitude of +150 volts and a minimum amplitude of −150 volts. A ring-down signal 156 having a gradually decreasing amplitude follows the signal 154 across the lines 46, 48. Such ring-down signals are a well known phenomenon and are usually present following the termination of voltage signals having very large magnitudes.

Referring back to FIG. 3, the amplifier 60 comprises a resistor 160 coupled across the lines 42, 44. The echo signal from the transducer 16 is developed across the resistor 160 and supplied to a conventional ferrite bead 162 which filters out frequencies that are much higher than the frequency of interest. The ferrite bead 162 is connected in series with a resistor 168 and a capacitor 170 which is connected to the noninverting input of a video amplifier 172 via a line 174. The video amplifier may be, for example, an NE592 integrated circuit commercially available from Motorola.

A pair of oppositely oriented diodes 180, 182 are connected to the line 174 to prevent the large amplitude excitation signal from the excitation circuit 34 from being transmitted to the amplifier 60. However, the diodes 180, 182 allow passage of the echo signal from the transducer 16 since the amplitude of the echo signal is much smaller than that of the excitation signal. The echo signal has an amplitude falling within ±0.7 volts.

A variable resistivity network is also connected to the line 174. This network includes a p-channel junction field-effect transistor (JFET) 188 having its gate connected to a resistor 192, a capacitor 194, a resistor 196 coupled to the line 72 which receives a first gain control (GN0) logic signal, and a resistor 198 coupled to the line 74 which receives a second gain control (GN1) logic signal. A diode 200 is coupled in parallel with the resistor 198.

The JFET 188 has a variable resistance across its source and drain terminals, depending upon the voltage applied to its gate. When its gate voltage is low, the JFET 188 presents a resistance of approximately 180 ohms across its source and drain terminals. When its gate voltage is about five volts, the JFET resistance is very large. By controlling the gate voltage within the intermediate range between approximately zero and five volts, the resistance provided across the JFET 188 can be controlled.

Controlling the resistance across the JFET 188 in the manner described above allows the gain of the amplifier 60 to be controlled. In particular, the resistance of the variable resistivity network is in parallel with a resistor 204 coupled to the line 174, and that parallel resistance combination is in series and forms a voltage divider with the resistor 168. Thus, the signal input to the amplifier 60 is effectively attenuated by the voltage divider in a controlled manner. If the resistance across the JFET 188 is relatively large, the signal input to the noninverting input of the amplifier 172 will have a greater magnitude than if the resistance across the JFET 188 is relatively small.

The resistance across the JFET 188 is controlled by the provision of the GN0 and GN1 logic signals, which are provided to the lines 72, 74 by the microprocessor 30. When the GN1 signal is low, or has a magnitude of about zero volts, the gate of the JFET 188 is held at about +0.7 volts, regardless of the value of the GN0 signal. As a result, the resistance across the JFET 188 is relatively low, and the signal input to the noninverting input of the amplifier 172 is attenuated by a first amount, which is relatively large.

When the GN1 signal is high, or about five volts, and the GN0 signal is low, the resistor 198 is effectively placed in series with the parallel combination of the resistors 192, 196, thus providing an intermediate voltage to the gate of the JFET 188. As a result, the JFET resistance has an intermediate value that is somewhat higher than its resistance when the GN1 signal is low. Accordingly, the signal input to the noninverting input of the amplifier 172 is attenuated by a second amount, which is smaller than the first relatively large amount.

When both the GN0 and GN1 signals are high, the resistor 192 is effectively placed in series with the parallel combination of the resistors 196, 198, thus providing a larger voltage to the base of the JFET 188. As a result, the JFET resistance is higher, and the signal input to the noninverting input of the amplifier 172 is attenuated by a third amount, which is less than the first two amounts described above.

Thus, changing the value of the GN0 and GN1 logic signals provides three discrete attenuation amounts or coefficients for the signal input to the amplifier 172. These attenuation coefficients do not change instantaneously upon the change of the GN0 and GN1 signals; they change relatively slowly due to the capacitor 194, which along with the resistors 192, 196, 198 provides a relatively large time constant.

The time constant is advantageously designed to be large so that the attenuation coefficient may gradually decrease over time to attenuate later-received output being provided on the line 80. The amplifier 172 is coupled to a series combination of an inductor 210 and a capacitor 212 which control the gain of the amplifier 172 so as to significantly amplify signals only within the desired frequency range of interest.

A series combination of a resistor 214 and a capacitor 216 on the line 78 provide a high pass filter for the noncomplemented output on the line 78. The high pass cutoff frequency is a frequency below the desired range of interest. Similarly, a series combination of a resistor 218 and a capacitor 229 provide a high pass filter for the complemented output on the line 80.

The current-to-voltage converter 66 coupled to the transducer comprises an operational amplifier 240 having a resistor 242 and a capacitor 244 coupled in parallel across its output and its inverting input. The inverting input is also connected to a positive voltage supply through a resistor 246 and to the temperature sensor 62 in the transducer 16 via the line 68. The noninverting input of the amplifier 240 is connected to ground.

In operation, the temperature sensor 62 draws one microampere of current from the converter 66 for each degree Kelvin of the sensed temperature. Since the noninverting input of the amplifier 240 is tied to ground, a fixed amount of current will be generated from a +5 voltage source through the resistor 246. This current will be split between a first current path comprising the line 68 into the temperature sensor 62 and a second current path across the resistor 242 to the output of the amplifier 240.

The value of the resistor 242 is chosen as a scaling factor to convert the operating temperature range of the detector 10 to a convenient voltage range for sensing by an A/D converter (not shown) in the microprocessor 30. The value of the resistor 246 is echo signals less than earlier-received echo signals. This is desirable since echoes that travel a longer distance through air, i.e. when there is a large distance between the transducer 16 and the liquid level, tend to generate electrical signals having lower magnitudes. Thus, the gain control circuit compensates for variations in the distance between the transducer 16 and the liquid level by attempting to equalize the magnitude of the electrical echo signals, regardless of the distance the echoes travelled.

FIG. 5 sets forth one example of the shape of the GN0 and GN1 signals and the resultant gain that is produced. Referring to FIG. 5, the GN0 and GN1 signal waveforms 206, 207, respectively, are shown to rise to a high level at the end of a predetermined deadband period, after the end of the ring-down signal 156. The GN0 and GN1 signals are reset at the close of the current receive window. As described in more detail below, the size of the receive window is variable. The shapes of five successive receive windows; WIN1, WIN2, WIN3, WIN4, WIN5, are shown at the bottom of FIG. 5. The GN0 and GN1 waveforms 206, 207 have the shapes shown in solid lines when the WIN1 window is used to receive the echo signal. Since the GN0 and GN1 signals are reset at the close of the window, the shapes of the GN0 and GN1 waveforms 206, 207 are altered as indicated by the dotted lines when the WIN5 window is used to receive the echo signal. The GAIN waveform 208 illustrates the slow rise in amplifier gain associated with the GN0 and GN1 signals. When the GN0 and GN1 signals are reset, the GAIN waveform drops in magnitude as indicated by the dotted portion of the GAIN waveform 208.

Referring back to FIG. 3, the amplifier 172 amplifies the attenuated signal and generates two complemented outputs therefrom, a first output signal being provided on the line 78 and a second complemented chosen to provide a particular offset to achieve the desired voltage range, and the capacitor 244 is provided for filtering purposes. The voltage indicative of the sensed temperature, TEMP, is supplied to the microprocessor 30 via the line 70.

Figure 4:
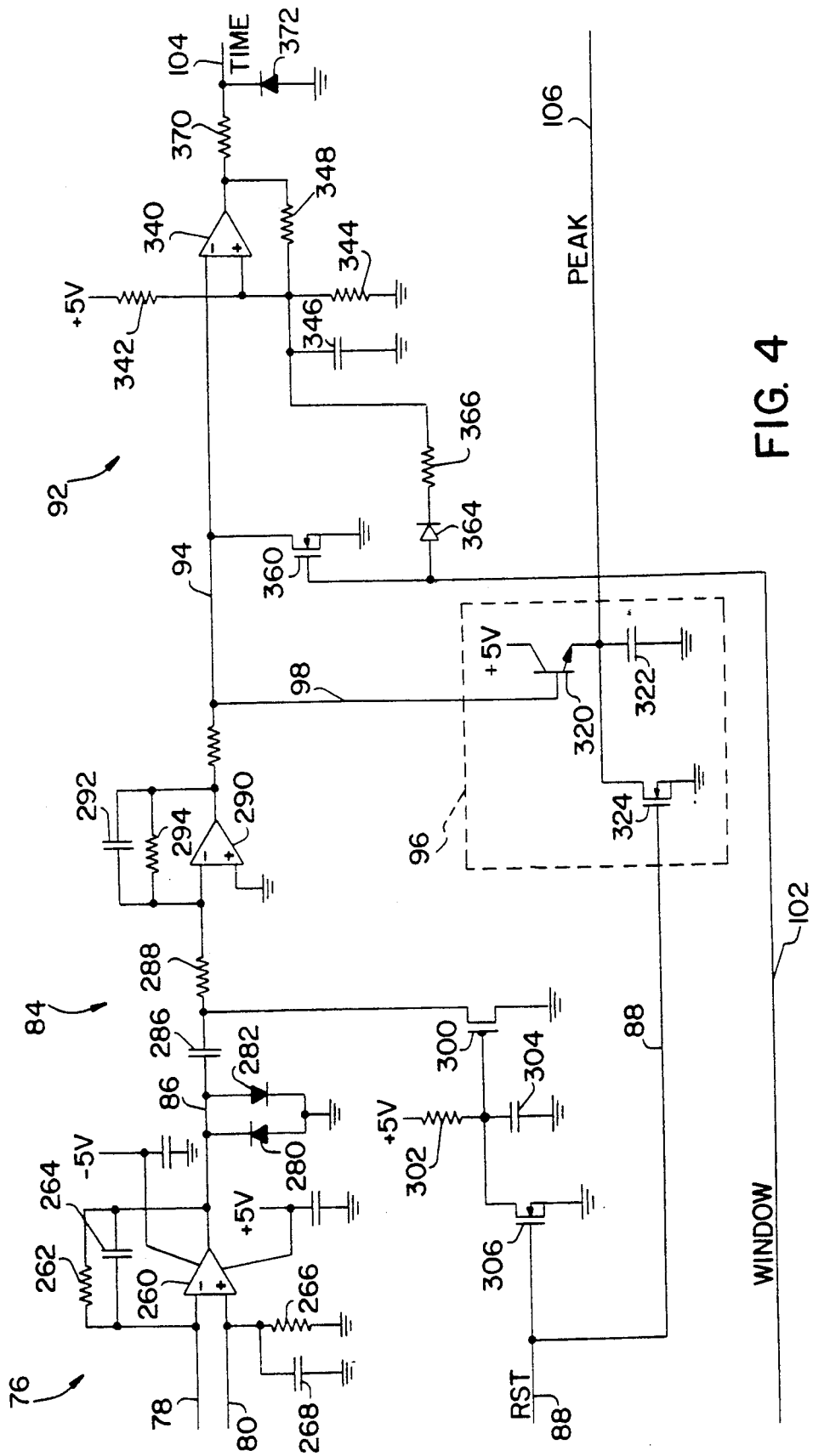
FIG. 4 is a circuit diagram of the amplifiers 76, 84, the peak detector 96, and the comparator 92 shown as blocks in FIG. 2.

Now referring to FIG. 4, a circuit diagram of the amplifier 76, the amplifier 84, the comparator 92, and the peak detector 96 shown as blocks in FIG. 1 is shown. The amplifier 76 is coupled to receive the echo signals from the amplifier 60 via the lines 78, 80. The amplifier 76 comprises an operational amplifier 260 having a single ended output. A parallel combination of a resistor 262 and a capacitor 264 is connected across the output and the inverting input of the amplifier 260. The noninverting input of the amplifier 260 is coupled to a parallel combination of a resistor 266 and a capacitor 268. Both of the parallel resistor-capacitor combinations constitute low pass filters that pass only frequencies below a cutoff frequency above the desired frequency range of interest.

The output of the amplifier 260 is provided on the line 86 to which a second pair of oppositely oriented diodes 280, 282 is connected. Like the diodes 180, 182, the diodes 280, 282 keep the voltage on the line 86 between about $-0.7$ volts and $+0.7$ volts. The magnitude of the echo signal will be within this voltage range.

The line 86 is connected to a capacitor 286 and a resistor 288 in series. This series combination acts as a high pass filter to filter out frequencies below the desired frequency range of interest. The echo signal is further amplified by an operational amplifier 290, which has a parallel combination of a capacitor 292 and a resistor 294 coupled across its output and inverting input. The capacitor 292 and resistor 294 cause the amplifier 290 to amplify only signals below a predetermined cutoff frequency.

The apparent gain of the amplifier 290 is controlled by a variable resistive network comprising a JFET 300 having its gate connected between the junction of a resistor 302, a capacitor 304, and a second FET 306. Like the JFET 188, the source-drain resistance of the JFET 300 varies depending upon the voltage supplied to its gate. This gate voltage is controlled by the FET 306, which operates as a switch under the control of a reset (RST) logic signal supplied from the microprocessor 30 via the line 88.

The purpose of the variable resistive network coupled to the amplifier 290 is to attenuate the undesirable ring-down following the large amplitude excitation pulses generated by the excitation circuit 34. The resistive network is controlled so that it has a small resistance during ring-down, in which case most of the undesired ring-down signal is shunted to ground through the JFET 300. To this end, the RST signal is made high during ring-down so that the FET 306 will conduct and pull the gate of the JFET 300 to a low voltage whereby the JFET 300 resistance is small. When the desired echo signal is expected, the RST signal is pulled low by the microprocessor 30 so that the FET 306 is turned off, thus raising the gate voltage of the JFET 300 to about five volts and making the JFET resistance very large. The capacitor 304 provides a relatively small time constant so that the JFET gate voltage rises quickly. The shape of the RST signal is shown in FIG. 5 as waveform 308.

The peak detector 96 is coupled to the output of the amplifier 290 and generates a voltage signal corresponding to the peak magnitude of the echo signal. The peak detector 96 comprises a bipolar transistor 320 having its base connected to the line 94, its collector connected to a high voltage, and its emitter connected to ground through a capacitor 322. The emitter of the transistor 320 is also connected to a FET 324 and the line 106 on which a voltage signal (PEAK) having a magnitude corresponding to the peak portion of the echo signal is provided to the microprocessor 30.

In operation, when the peak detector 96 is awaiting the echo signal, the RST signal supplied to the gate of the FET 324 is low, thus rendering the FET 324 nonconductive. In this state, the echo signal will charge up the capacitor 322 to a voltage corresponding to the highest magnitude of the echo signal minus the base-emitter voltage of about 0.7 volts.

The microprocessor 30 reads the highest voltage supplied by the PEAK signal, and then the peak detector is reset by the microprocessor 30 by supplying a high RST signal to the gate of the FET 324, thus rendering the FET 324 conductive and discharging the capacitor 322 through the FET 324. As described in more detail below, the value of PEAK is used by the microprocessor 30 to adjust the number of excitation pulses sent to the transducer 16 and to adjust the gain of the amplifier 60. The shape of the PEAK signal is shown in FIG. 5 by a waveform 326, and the associated echo signal is shown in FIG. 5 as a waveform 328.

The comparator 92 is coupled to receive the echo signal from the amplifier 84. The comparator 92 comprises an operational amplifier 340 having its inverting input connected to the line 94. The noninverting input of the amplifier 340 is connected to the junction of a pair of resistors 342, 344 and a capacitor 346. A resistor 348 is coupled between the output and the noninverting input of the amplifier 340. The output of the amplifier 340 may range between $-5$ volts and $+5$ volts.

The comparator 92 utilizes hysteresis to provide two distinct voltage thresholds which are required to trigger an active comparator output during the receive window in which the echo signal is expected to be received. When the signal input to the inverting input of the amplifier 340 is less than the signal input to its noninverting input, which is the case when no echo signal is being received by the amplifier 340, the output of the amplifier 340 is $+5$ volts. In this state, the resistor 348 is effectively in parallel with the resistor 342 since both are coupled to +5 volts, effectively providing a higher voltage threshold than would be provided by the series combination of the resistors 342, 344 alone. This first voltage threshold may be about 1.5 volts, for example.

When the echo signal has a magnitude larger than the first voltage threshold, the output of the amplifier goes from +5 volts to −5 volts. As a result, the resistor 348 is no longer effectively in parallel with the resistor 342. In this case, instead of providing a threshold greater than the series combination of the resistors 342, 344 alone, the resistor 348 reduces that voltage threshold to provide a second voltage threshold lower than the first voltage threshold. The second voltage threshold may be about 1.2 volts, for example. These two voltage thresholds are used during the receive window when the comparator is expecting to receive the echo signal. As described in more detail below, outside the receive window the comparator threshold voltage is increased greatly to a third threshold to prevent spurious signals from being interpreted by the microprocessor 30 as being valid echo signals.

The receive window of the invention gradually narrows about the expected level of the liquid. The purpose of the receive window is to ignore spurious signals such as noise and to prevent them from being mistaken as valid echo signals.

When the detector begins operation, the receive window is made relatively large since the detector does not know where the level of the liquid will be. Each time that the liquid level is detected, the receive window associated with the liquid is made successively smaller. The shapes of five successive window signals, WIN1, WIN2, WIN3, WIN4, WIN5, are shown in FIG. 5.

The receive window is implemented by a logic signal referred to herein as WINDOW. Referring still to FIG. 4, the WINDOW signal is supplied to the comparator 92 via the line 102. The WINDOW signal controls two separate aspects of the comparator operation. First, the WINDOW signal determines whether the comparator is connected to receive any signal from output of the amplifier 290. This aspect is achieved by supplying the WINDOW signal to the gate of a FET 360 connected to the line 94. When the WINDOW signal is high, the FET 360 is rendered conductive, and any electrical signal that happens to be on the line 94 is shunted to ground through the FET 360. As a result, the amplifier 340 does not receive such spurious signals.

A second aspect of the comparator operation is controlled by the WINDOW signal. The line 102 on which the WINDOW signal is provided is connected to the noninverting input of the amplifier 340 through a diode 364 and a resistor 366. When the WINDOW signal is high, at about +5 volts, the resistor 366 is effectively placed in parallel with the resistor 342. Since the value of the resistor 366 is chosen to be much smaller than the value of the resistor 342, the voltage at the noninverting input of the amplifier 340, and hence the voltage threshold necessary to be surpassed to activate the comparator is very high, close to five volts for example. The provision of this greatly increased comparator threshold further decreases the likelihood that spurious electrical signals will be improperly interpreted as valid echo signals.

The output of the amplifier 340 is passed through a resistor 370 and is output as a TIME signal, which indicates the receipt of an echo signal. A diode 372 limits the negative amplitude of the TIME signal. The shape of the TIME signal is shown in FIG. 5 as waveform 380 in its time relationship with respect to the echo waveform 328 and the PEAK waveform 326.

OPERATION OF COMPUTER PROGRAM

Figure 6:
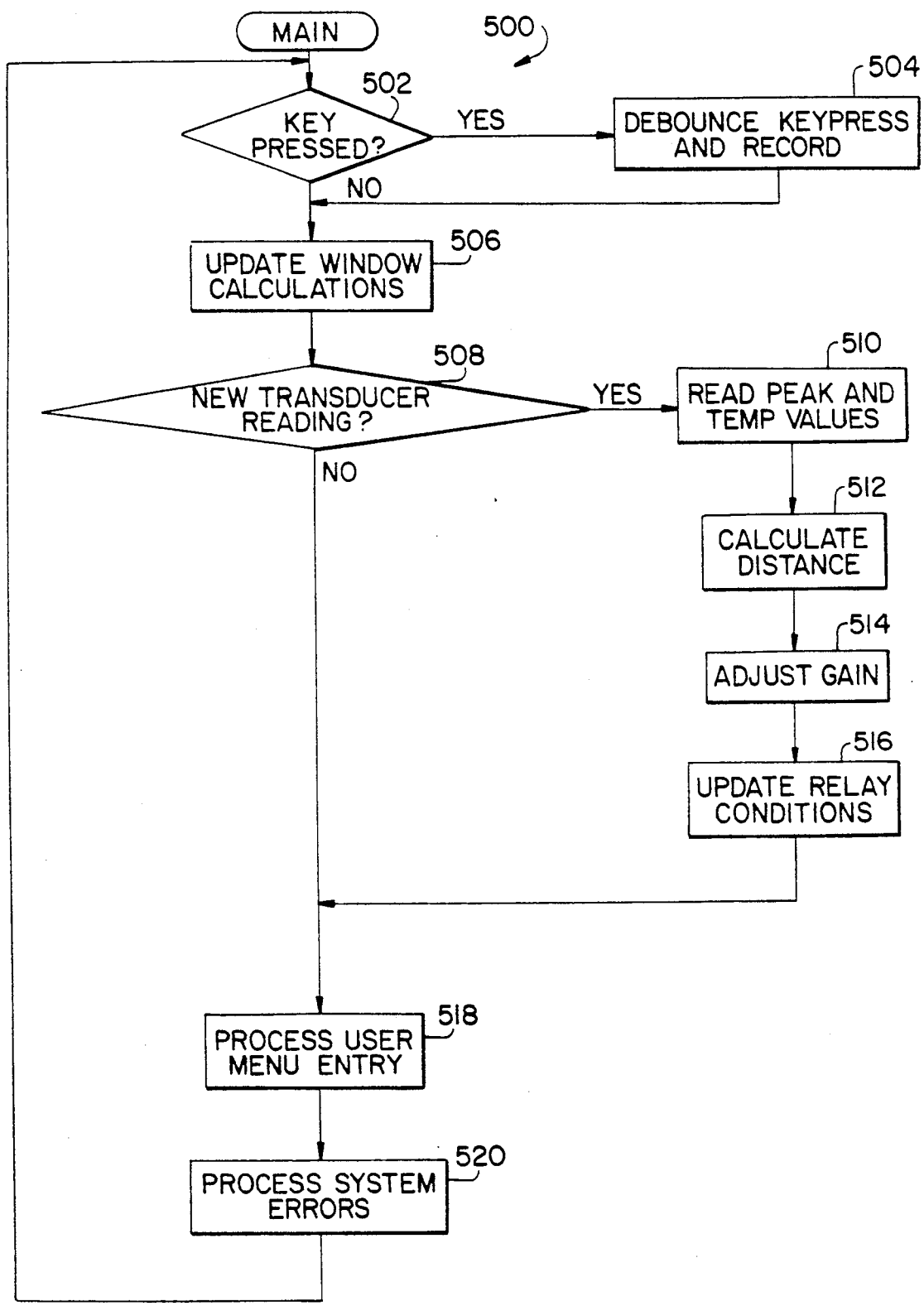
FIG. 6 is an overall diagram of the operation of a computer program stored in the PROM 32 of FIG. 2.

The operation of the detector 10 is controlled by a computer program stored in the PROM 32 and executed by the microprocessor 30. An overall diagram of the operation of the computer program is shown in FIG. 6. The main loop 500 of the computer program comprises a number of basic steps. At step 502, the loop determines whether a key has been pressed. An operator may input various information into the detector 10 via a number of entry keys (not shown). If a key has been pressed by the operator, the program branches to step 504 where the keypress is debounced and recorded in the detector 10 in a conventional manner.

At step 506, various calculations relating to the receive window are made. These calculations, which are described in detail below in connection with FIG. 8, include determining the size, boundaries, and location of the receive window.

At step 508, the program determines whether a new transducer reading has been made. As described above, the transducer 16 is periodically excited with a burst of energy to periodically detect the liquid level. If the microprocessor 30 has received a new echo signal or reading from the transducer 16, the program branches to step 510 where the values of the PEAK signal from the peak detector 96 and the TEMP signal from the current-to-voltage converter 66 are read by the microprocessor 30 and stored for later use.

At step 512, the distance between the transducer 16 and the liquid level is calculated based upon the latest reading from the comparator 92. This distance calculation and related steps that are performed in connection therewith are shown in greater detail in FIG. 7.

At step 514, the gain of the amplifier is adjusted based upon values of the GN0 and GN1 signals retrieved from a gain table as described in more detail below. At step 516, various relay conditions are updated. The detector 10 has a number of relays (not shown) that may be triggered upon the detection of an alarm condition. If any alarm or other conditions exist when step 516 is executed, the appropriate relays are triggered.

At step 518, the program processes any menu entry input by the operator. This step may include, for example, changing alarm limits, changing the operating span of the detector, etc. At step 520, the program processes any system errors that may have occurred. The program then branches back to step 502, the main loop 500 being continuously repeated.

Figure 7:
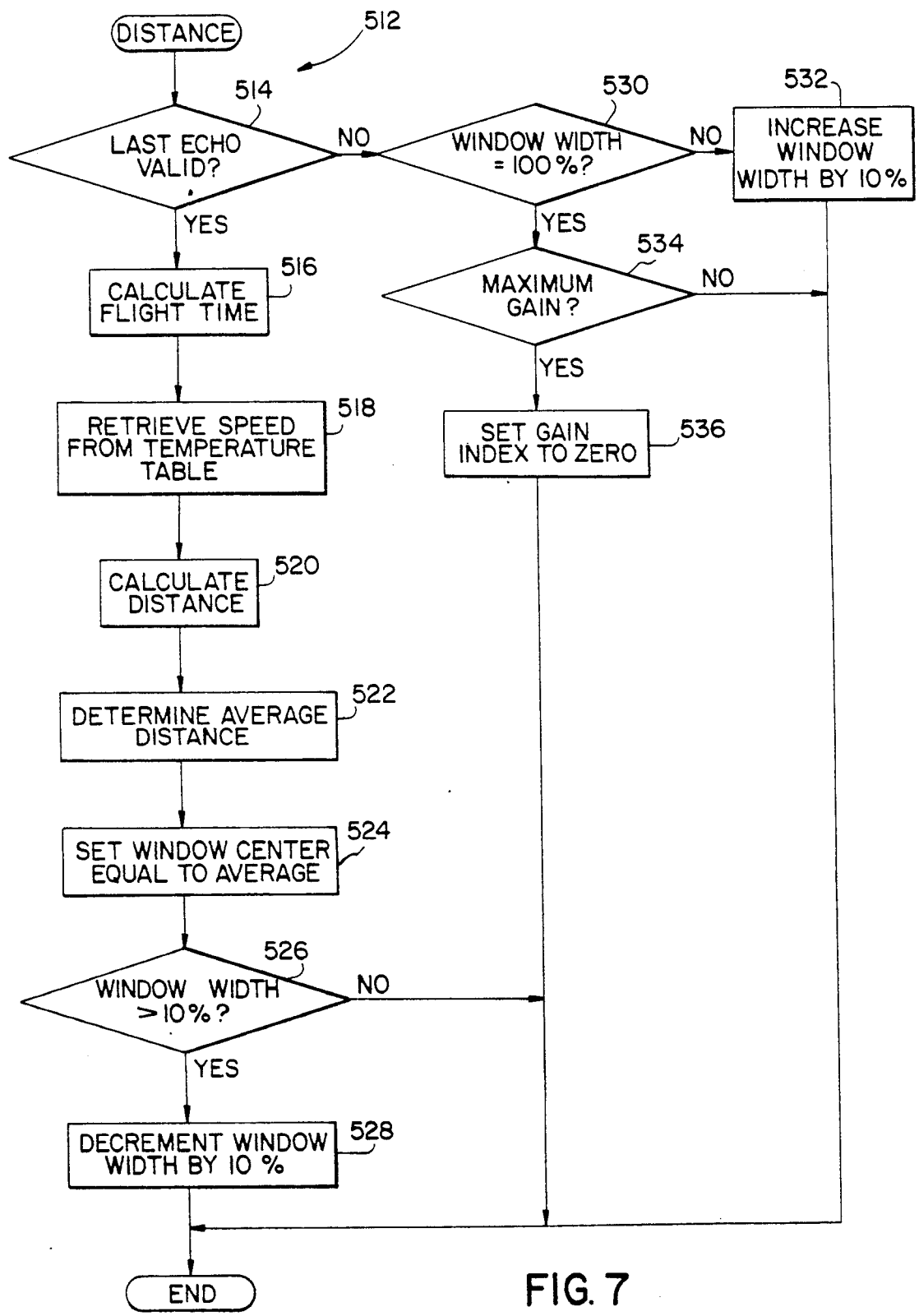
FIG. 7 is a flowchart of the calculate distance step 512 shown as a block in FIG. 6.

A flowchart of the calculate distance step 512 shown schematically in FIG. 6 is illustrated in FIG. 7. The basic operation of the calculate distance step 512 includes determining the distance between the transducer 16 and the level of the surface and making adjustments to the size of the receive window in certain cases.

Now referring to FIG. 7, at step 514 the program determines whether a valid echo was received. In order for a received echo to be valid, two conditions must be satisfied: (1) the comparator 92 must be triggered by an echo signal having a magnitude surpassing the threshold; and (2) the comparator must be so triggered during the receive window. This latter condition is determined by the computer program by determining whether the time occurrence of the low TIME signal occurred within the receive window.

If a valid echo has been received, the program branches to step 516 at which point the flight time is calculated. The flight time is the time required for the energy burst to travel from the transducer 16 to the liquid surface and back. The flight time is calculated by determining the time difference between the initial excitation signal transmitted by the excitation circuit 34 and the receipt of a low TIME signal 380.

At step 518, the speed at which the energy burst travelled from the transducer 16 to the liquid surface and back is determined based upon the magnitude of the temperature as indicated by the value of the TEMP signal on the line 70. The speed is retrieved from a software lookup table which provides a separate speed for each temperature in the temperature operating range of the detector 10.

At step 520, the distance between the transducer 16 and the liquid level is determined based upon the flight time determined in step 516 and the speed determined in step 518. At step 522, an average distance is determined based upon the previous eight values of the distance determined. This averaging of the last eight distances minimizes spurious liquid level changes caused by surface turbulence, for example.

Steps 524–528 relate to the size and location of the receive window. At step 524, the center of the window is set equal to the average distance from the transducer 16 as determined during step 522. As a result, the receive window will be centered about the expected time of arrival of the next echo signal.

Figure 10A:
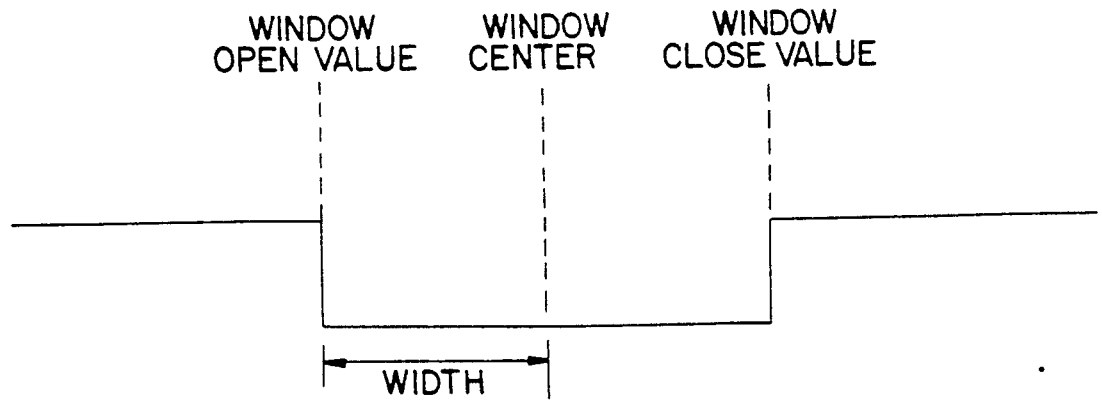
FIGS. 10a-c illustrate a number of receive windows in accordance with the preferred embodiment.

At step 526, the current window width is tested to determine whether it is greater than 10% of its maximum possible size. As used herein, the term "window width" is defined as the distance between the center of the window and one of its edges. "Window length" means twice the window width. The window width is illustrated in FIG. 10a. As described below, the width of the window is variable, and may vary from 10% to 100% of its maximum possible size in 10% increments. Thus, at step 526, if the window width is greater than 10%, the program branches to step 528 where the window width is reduced by 10%. If the window width was not greater than 10% as determined at step 526, then the window is at its minimum size and is not reduced any further. In this case the program skips step 528. Of course, the minimum size of the window could be made smaller than 10% of the range, such as a smaller percentage of the range or a fixed predetermined minimum distance such as two inches.

Although the receive window is described herein in terms of "width" and "length," it should be appreciated that the actual receive window is of course a period of time.

Steps 516–528 as described above are performed only if a valid echo was found. If a valid echo was not found, the program branches to step 530 to begin a short sequence of remedial steps performed to attempt to achieve a valid echo. At step 530, the window width is tested to determine whether it is 100%, which is the maximum window width. If the window width is not 100%, then the program branches to step 532 where the window width is increased by 10%.

If the window width is 100%, the program branches to step 534 where the overall gain value of the detector 10 is tested to determine whether the maximum gain is being used. As described above, this gain is determined by the value of the GN0 and GN1 logic signals supplied by the microprocessor 30 and the number of excitation pulses used. If the maximum gain is not being used, the calculate distance portion 512 of the program ends. In this case of a valid echo not being found, the gain will be increased in a gain adjustment portion 514 of the program described in connection with FIG. 9.

If the gain is at its maximum value, the program branches to step 536 where the gain index is set equal to zero. As described below, the gain index is used to retrieve a particular combination of the gain signals GN0 and GN1 and excitation pulse number from a gain lookup table in memory. By providing a gain index of zero, the gain is set to its minimum value in an attempt to determine whether a different gain value would cause a valid echo to be received.

Figure 8:
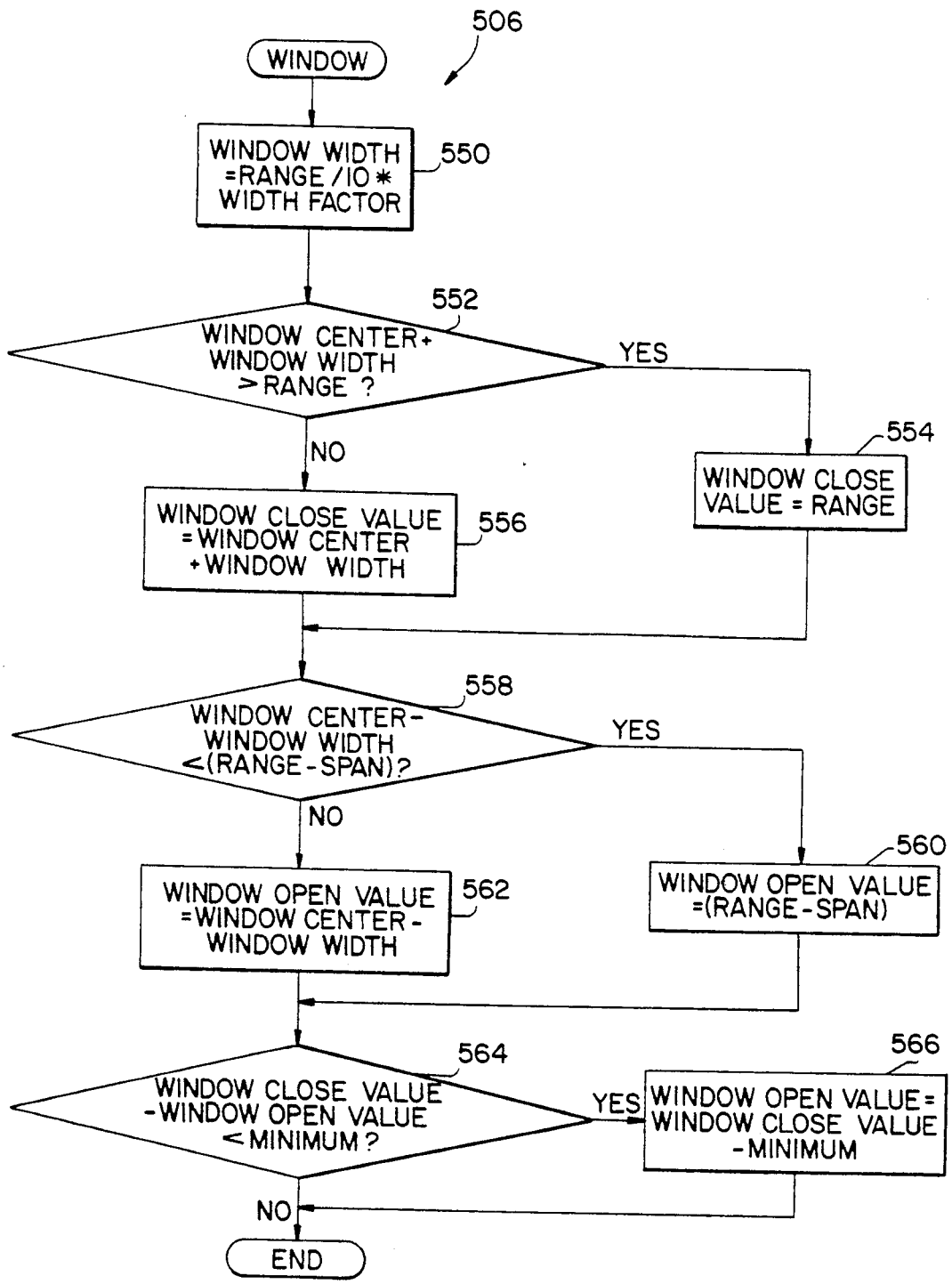
FIG. 8 is a flowchart of the update window calculations step 506 shown as a block in FIG. 6.
Figure 10B:
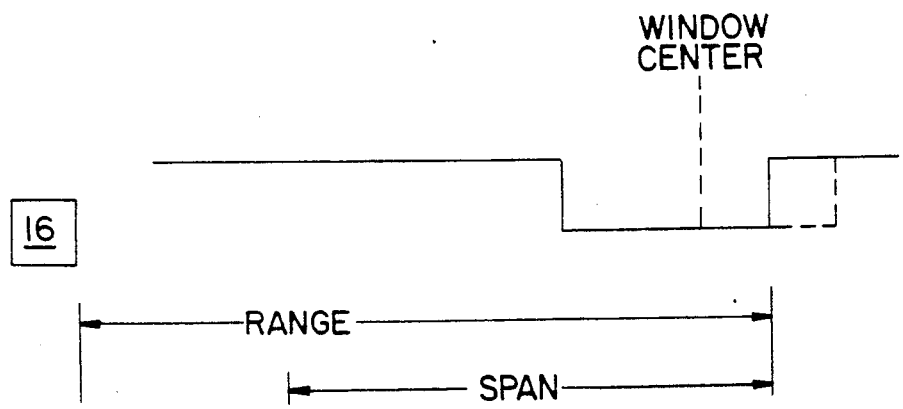
Figure 10C:
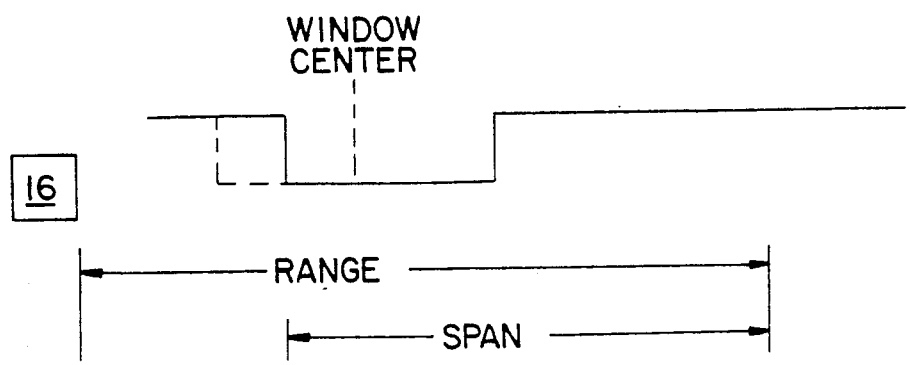

A flowchart of the window calculations step 506 shown as a block in FIG. 6 is shown in FIG. 8. This portion of the program determines the size and boundaries of the window. At step 550, the window width is determined based on the range of the detector 10 and a width factor. As used herein, the term "range" means the distance from the transducer 16 to its distal operating endpoint. For example, if the bottom of the container 12 of FIG. 1 were 10 feet below the bottom of the transducer 16, the range would be 10 feet. The range is illustrated in FIGS. 10b and 10c.

Referring back to FIG. 8, the width factor of step 550 is a integral number from 1 to 10. Thus, the window width may vary from 10% of the range to 100% of the range. In the example described above, the window width would vary in one foot increments since the range was 10 feet. During the initial execution of step 550, before the detector 16 has determined the level of the liquid, the width factor is set equal to 10 so that the receive window extends for the entire range.

Steps 552–562 are used to determine the open and close values, or boundaries, of the receive window. These values cannot necessarily be determined from the window center and window width alone since in some cases a portion of the window may lie outside the operating span of the detector 10.

At step 552, the sum of the window center and window width is compared to determine whether it is greater than the range. If the sum is greater than the range, then a portion of the window would lie outside the operating span of the detector 10. In this case, the program branches to step 554 where the window close value is set equal to the range. For example, referring to FIG. 10b, assume that the window center is at 9 feet, the window width is 2 feet, and the range is 10 feet. In this case, the receive window would extend outside the operating span of the detector, as illustrated by the dotted portion of the window. In this case, when step 554 was performed, the window close value would be set equal to 10 feet.

If the sum of the window center and the window width is not greater than the range, then the program branches to step 556, at which point the window close value is determined based on the window center and the window width. In particular, the window close value is set equal to the sum of the window center and the window width.

At step 558, which is analogous to step 556, the program determines whether the other boundary of the receive window would extend outside the other end of the operating span of the detector, which is determined by the difference between the range and the span. At step 558, the window width is subtracted from the window center and that difference is compared to the value of the range minus the value of the span. If the difference between the window center and window width is smaller, then the program branches to step 560 where the window open value is set equal to the value of the range minus the value of the span.

For example, referring to FIG. 10c, assume that the range is 10 feet, the operating span is 7 feet, the window center is 4 feet, and the window width is 2 feet. In this case, the window would extend beyond the left end of the operating span as indicated by the dotted line. In this case, when step 560 were performed, the window open value would be set equal to 3 feet instead of 2 feet.

If the difference between the window center and window width is not less than the difference between the range and span as determined at step 558, then the program branches to step 562 where the window open value is set equal to the window center minus the window width.

Step 564 ensures that the receive window is at least a minimum length. In certain cases, the window length determined by steps 550-562 may correspond to a very short distance, one-half of one inch for example. In this case the window length would be set to a predetermined minimum distance to make it longer. To this end, at step 564 the window open value is subtracted from the window close value and that difference is compared with the predetermined minimum window length. If the window length is smaller than the minimum, then the program branches to step 566 where the window open value is set equal to the difference between the window close value and the minimum length.

Figure 9:
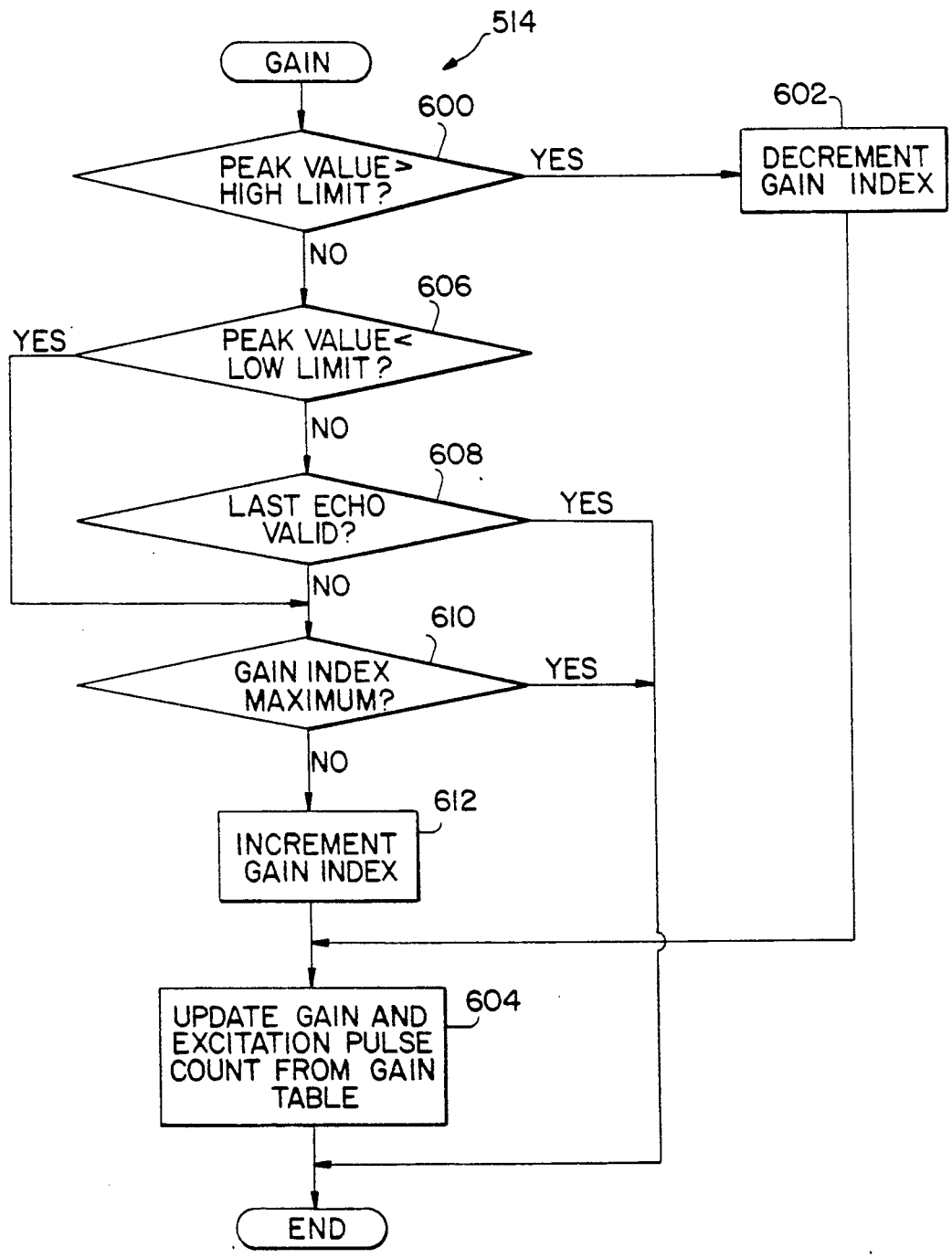
FIG. 9 is a flowchart of the gain adjustment step 514 shown as a block in FIG. 6.

A flowchart of the gain adjustment step 514 shown as a block in FIG. 6 is shown in FIG. 9. The gain adjustment step periodically adjusts the gain of the amplifier 60 by changing the gain signals GN0 and GN1 and the number of excitation pulses supplied to the transducer 16. The values of the GN0 and GN1 signals and the number of excitation pulses to be used are retrieved from a gain lookup table stored in the PROM 32, based upon the value of a gain index. Generally, as the gain index increases, the gain of the amplifier 60 increases and the number of excitation pulses transmitted to the transducer 16 increases. Thus, increasing the gain index will increase the magnitude of the echo signal. The contents of this gain table are set forth below.

| | GAIN TABLE | | |
|---|---|---|---|
| Index | Pulses | GN1 | GN0 |
| 0 | 1 | 0 | 0 |
| 1 | 2 | 0 | 0 |
| 2 | 3 | 0 | 0 |
| 3 | 4 | 0 | 0 |
| 4 | 5 | 0 | 0 |
| 5 | 3 | 0 | 1 |
| 6 | 4 | 0 | 1 |
| 7 | 5 | 0 | 1 |
| 8 | 6 | 0 | 1 |
| 9 | 7 | 0 | 1 |
| 10 | 3 | 1 | 0 |
| 11 | 4 | 1 | 0 |
| 12 | 5 | 1 | 0 |
| 13 | 6 | 1 | 0 |
| 14 | 7 | 1 | 0 |
| 15 | 3 | 1 | 1 |
| 16 | 4 | 1 | 1 |
| 17 | 5 | 1 | 1 |
| 18 | 6 | 1 | 1 |
| 19 | 7 | 1 | 1 |
| 20 | 8 | 1 | 1 |
| 21 | 9 | 1 | 1 |

-continued

| | GAIN TABLE | | |
|---|---|---|---|
| Index | Pulses | GN1 | GN0 |
| 22 | 10 | 1 | 1 |

Now referring to FIG. 9, at step 600 the peak value of the echo signal as determined by the peak detector 96 is compared with a predetermined high limit. If the peak value is higher than the limit, then the program branches to step 602 where the gain index is decremented. The program then branches to step 604 where the new values of GN0 and GN1 are retrieved along with the new number of excitation pulses.

If the peak value was not greater than the high limit as determined at step 600, the program branches to step 606. Steps 606-608 determine if the peak value of the echo signal is smaller than a predetermined low limit or if the last echo was invalid. In either case, the gain index is increased to increase the gain. Thus, at step 606 if the peak value is less than the low limit, the program branches to step 610 where the gain index is tested to determine whether it is at its maximum value. At step 608, if the last echo was not valid, then the program also branches to step 610.

At step 610, if the gain index is not at its maximum, then the gain index is incremented and the corresponding values are retrieved from the gain table at step 604. If the gain index is already at its maximum, then the program simply bypasses steps 612 and 604 since nothing more can be done to increase the gain.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An ultrasonic level detector for sensing the location of a surface to be detected with respect to a transducer, said level detector having a successively narrowed receive window centered about the expected time of arrival of an echo from said surface to reduce the likelihood of obtaining false indications of said surface due to noise or extraneous signals, said level detector comprising:

means for periodically generating an excitation signal;

transducer means coupled to said generating means for converting said excitation signal into a burst of energy, transmitting said burst of energy towards said surface, receiving reflected energy from said surface, and generating an electrical signal based upon the magnitude of said reflected energy;

comparator means coupled to the output of said transducer means for comparing the magnitude of said electrical signal with a threshold in order to detect an echo signal;

means for determining a receive window associated with the level of said surface, said receive window being successively narrowed and centered about the expected time of arrival of said echo from said surface, said determining means causing said threshold of said comparator means to have a first relatively low value during said receive window and a second relatively high value outside of said receive window whereby the likelihood that spurious electrical signals generated by said transducer means are erroneously interpreted as valid echo signals is reduced; and means for determining the level of the surface based upon the flight time associated with said echo signal.

2. A level detector as defined in claim 1 wherein said excitation signal comprises a number of electrical pulses of an ultrasonic frequency, said number of pulses being selectively controlled based upon the strength of the electrical signal generated by said transducer means.

3. A level detector as defined in claim 1 wherein said means for determining a receive window comprises means for reducing the size of the receive window by a predetermined amount after the receipt of a valid echo.

4. A level detector as defined in claim 1 wherein said comparator means comprises an operational amplifier having feedback from its output to one of its inputs to provide hysteresis.

5. A detector comprising:
an excitation circuit for generating an excitation signal;
a transducer coupled to said excitation circuit to receive said excitation signal, said transducer generating a burst of energy in response to receiving said excitation signal and transmitting said burst of energy towards a surface to be detected, said transducer receiving reflected energy and converting said reflected energy into an electrical signal;
a comparison circuit coupled to the output of said transducer, said comparison circuit having a threshold and comparing the magnitude of said electrical signal with said threshold in order to detect an echo signal; and
a window generator circuit that generates a receive window associated with the level of said surface, said receive window being successively narrowed about the expected time of arrival of said echo signal from said surface,
said window generator circuit causing said threshold of said comparison circuit to have a first relatively low value during said receive window and a second relatively high value outside of said receive window.

6. A detector as defined in claim 5 wherein the output of said comparison circuit is connected to one of the inputs of said comparison circuit to drop said first relatively low value of said comparator threshold to a third, relatively lower value in response to the detection of an electrical signal having a magnitude greater than said first relatively low value.

7. A detector as defined in claim 5 wherein the value of said threshold is controlled by a JFET.

8. A detector as defined in claim 5 wherein said window generator circuit comprises a microprocessor.

9. A method of detection of a surface that may have a changing level, said method comprising the steps of:
(a) determining a receive window associated with said surface to be detected;
(b) transmitting a burst of energy towards said surface;
(c) receiving energy reflected from said surface;
(d) generating an electrical signal based upon the energy received in said step (c);
(e) comparing said electrical signal to a first relatively high threshold outside of said receive window;
(f) comparing said electrical signal to a second relatively low threshold during said receive window to detect an echo signal; and
(g) narrowing said receive window in response to the detection of an echo signal during said step (f),
wherein the position of the surface is determined based upon the flight time associated with said echo signal.

10. A method as defined in claim 9 comprising the additional step of:
(h) lowering said second threshold to a third threshold in response to the detection of an echo signal during said step (f).

* * * * *